United States Patent
Matsumoto et al.

(10) Patent No.: US 7,675,284 B2
(45) Date of Patent: Mar. 9, 2010

(54) ROTATION ANGLE DETECTING DEVICE

(75) Inventors: Kouichirou Matsumoto, Kariya (JP); Takashi Kawashima, Nagoya (JP); Tatsuya Kitanaka, Nagoya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 189 days.

(21) Appl. No.: 11/874,459

(22) Filed: Oct. 18, 2007

(65) Prior Publication Data

US 2008/0100285 A1   May 1, 2008

(30) Foreign Application Priority Data

Oct. 26, 2006   (JP)   ................ 2006-291157

(51) Int. Cl.
*G01B 7/30* (2006.01)
(52) U.S. Cl. .............. 324/207.25; 324/207.11
(58) Field of Classification Search ......... 324/173–174, 324/207.2, 207.25, 251; 73/514.16, 514.31, 73/514.39; 338/32 R, 32 H; 123/612, 617
See application file for complete search history.

(56) References Cited

U.S. PATENT DOCUMENTS

| 6,019,086 | A  | * | 2/2000 | Schneider et al. | ...... 123/406.61 |
| 7,202,659 | B2 | * | 4/2007 | Ushihara et al. | ....... 324/207.25 |
| 2005/0242802 | A1 | | 11/2005 | Matsumoto et al. | |
| 2006/0028204 | A1 | * | 2/2006 | Oohira | ................. 324/207.25 |

FOREIGN PATENT DOCUMENTS

JP   2003-075108   3/2003
JP   2005-315764   11/2005

* cited by examiner

*Primary Examiner*—Bot L LeDynh
(74) *Attorney, Agent, or Firm*—Nixon & Vanderhye PC

(57) ABSTRACT

A rotation angle detecting device includes a permanent magnet member, a pair of magnetic sensor elements disposed in a magnetic field formed by the permanent magnet member to provide a pair of output voltage signals when the magnetic field changes as the rotating object rotates; and a rotation angle calculating unit. The rotation angle calculating unit calculates a phase difference between the pair of output voltage signals from a magnitude of the output signal of one of the magnetic sensor elements when detecting a specific magnitude of the output signal of the other magnetic sensor elements whose phase angle is known.

8 Claims, 6 Drawing Sheets

ROTATION ANGLE DETECTING DEVICE

CROSS REFERENCE TO RELATED APPLICATION

The present application is based on and claims priority from Japanese Patent Application 2006-291157, filed Oct. 26, 2006, the contents of which are incorporated herein by reference.

BACKGROUND OF THE INVENTION

1. Field of the Invention

The present invention relates to a rotation angle detecting device that detects a rotation angle of a rotating object.

2. Description of the Related Art

JP-2003-75108-A discloses a rotation angle detecting device that includes a pair of magnetic sensors and a magnetic field forming member. When a rotating object rotates, the pair of magnetic sensors of such a rotation angle detecting device is arranged to rotate relative to a magnetic field formed by the magnetic field forming member, thereby providing a pair of output signals, which is converted into a rotation angle of the rotating object.

However, if the phase difference between the output signals varies, it is difficult to detect an accurate rotation angle of the rotating object.

SUMMARY OF THE INVENTION

Therefore, an object of the invention is to provide a rotation angle detecting device that can detect a rotation angle of a rotating object with a minimum margin of error caused by the phase difference.

Another object of the invention is to provide a rotation angle detecting device that prevents the detection error from increasing after such a rotation angle detecting device is put to use.

According to a feature of the invention, a rotation angle detecting device for detecting a rotation angle of a rotating object includes a magnetic field forming means for forming a magnetic field, a pair of magnetic sensor elements disposed in the magnetic field to provide a pair of output signals when the magnetic field changes as the rotating object rotates and a rotation angle calculating means for calculating a rotation angle of the rotating object from the pair of output signals. In the above rotation angle detecting device, the rotation angle calculating means calculates a phase difference between the pair of output signals from a magnitude of the output signal of one of the magnetic sensor elements when detecting a specific magnitude of the output signal of the other magnetic sensor elements whose phase angle is known.

Thus, the rotation angle can be calculated from the phase difference and the known phase angle. The phase difference between the output signals of the magnetic sensor elements does not include any error caused by mechanical errors.

Therefore, the phase difference can be detected accurately even after the rotation angle detecting device is shipped or installed to a vehicle. When the rotation angle detecting device is shipped, the output signals of the pair of magnetic sensors are measured to find out a variation in the phase difference to adjust the magnitude of the output signals. This measurement can be taken after shipment. That is, the detection error can be prevented for a long period.

According to another feature of the invention, a rotation angle detecting device for detecting a rotation angle of a rotating object includes a magnetic field forming means for a forming magnetic field, a pair of magnetic sensor elements disposed in the magnetic field to provide a pair of output signals when the magnetic field changes as the rotating object rotates and a rotation angle calculating means for calculating a rotation angle of the rotating object from the pair of output signals. In this device, the rotation angle calculating means calculates a phase difference between the pair of output signals from a magnitude of the output signal of one of the magnetic sensor elements when detecting that magnitudes of the output signals of the pair of magnetic sensor elements are same to each other.

Therefore, the phase difference can be detected even after the rotation angle detecting device is shipped or installed to a vehicle, and the detection error can be prevented for a long period.

According to another feature of the invention, a rotation angle detecting device for detecting a rotation angle of a rotating object includes a magnetic field forming means for forming magnetic field, a pair of magnetic sensor elements disposed in the magnetic field to provide a pair of output signals when the magnetic field changes as the rotating object rotates; and a rotation angle calculating means for calculating a rotation angle of the rotating object from the pair of output signals. In this device, the rotation angle calculating means calculates a phase difference between the pair of output signals from magnitudes of the output signals of the pair of magnetic sensor elements.

Therefore, the phase difference can be detected even after the rotation angle detecting device is shipped or installed to a vehicle, and the detection error can be prevented for a long period.

In one of the above defined rotation angle detecting devices, the rotation angle calculating means may correct an offset of the output signals before calculating the phase difference or make the output signals the same amplitude before calculating the phase difference. The phase difference may be updated after the magnitude of the output signals becomes a preset value certain times or a certain time after the magnitude of the output signals becomes a preset value.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Some preferred embodiments according to the present invention will be described with reference to the appended drawings.

A rotation angle detecting device 10 according to the first embodiment of the invention will be described with reference to FIGS. 1-5 and FIGS. 6A, 6B, 6C.

Figure 2:
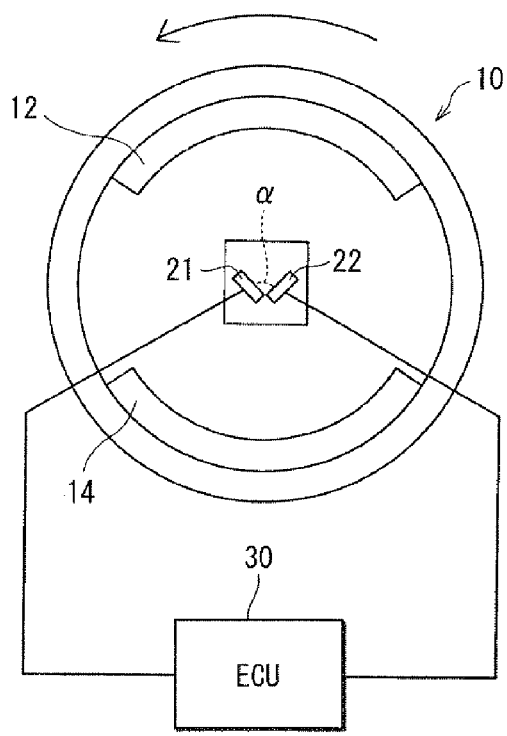
FIG. 2 is a schematic diagram of the rotation angle detecting device according to the first embodiment.

The rotation angle detecting device 10 according to the first embodiment is a device for detecting rotation angle of an engine crankshaft of a vehicle or a steering wheel thereof. As shown in FIG. 2, the rotation angle detecting device 10 includes a pair of permanent magnets 12 and 14, a pair of Hall elements 21 and 22 and an electronic control unit 30 (hereinafter referred to the ECU 30). The Hall elements 21, 22 and the ECU 30 are formed in a unit. However, they can be separated from each other.

Figure 3:
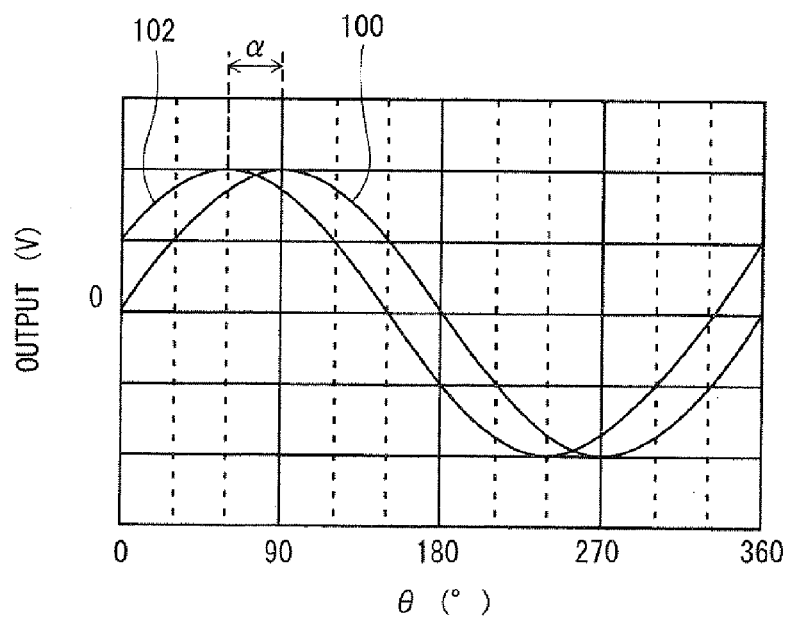
FIG. 3 is a graph showing the output voltage signals of a pair of Hall elements when a magnetic field rotates relative to the pair of Hall elements.
Figure 4:
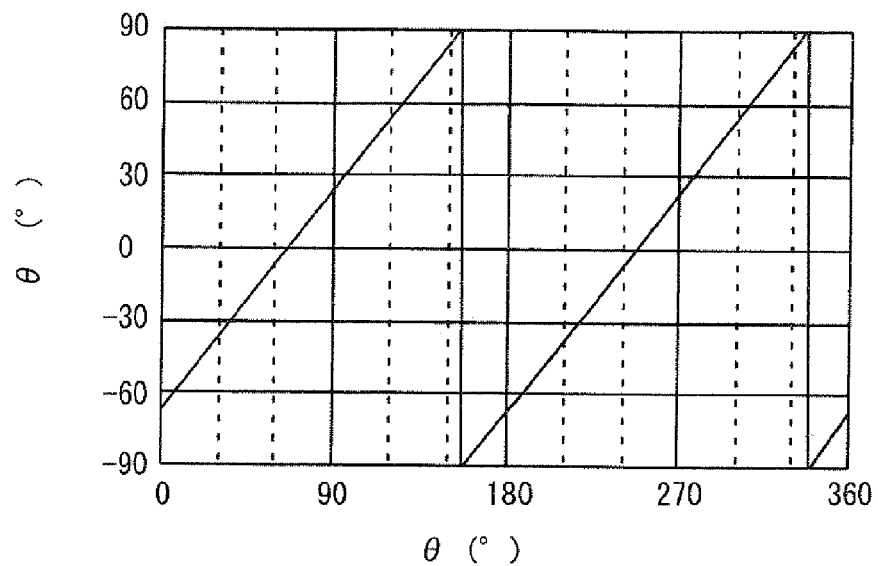
FIG. 4 is a graph showing a relation between the rotation angle of the rotating object and operation angle.

The permanent magnets 12, 14 form a magnetic field forming member that provides a parallel magnetic field of a uniform magnetic flux density and rotates together with a rotating object. The Hall elements 21, 22 incline to each other at an angle α to form a magnetic sensor, which is connected to the ECU 30 to be operated thereby. The ECU 30 has a memory that is installed a rotation angle calculation program, which will be described later. When the permanent magnets 12, 14 of the field forming member rotates together with a rotating object, the Hall elements 21, 22 output a pair of sinusoidal voltage signals 100, 102 whose phase difference is α, as shown in FIG. 3.

Assuming that: the rotation angle of a rotating object is θ; the output voltage of the output voltage signal 100 is Va; the output voltage of the output voltage signal 102 is Vb; the sensitivity coefficient of the Hall elements is k; the initial phase angle of the output voltage signals of the Hall elements 21, 22 are, respectively, β and γ; the magnetic flux density of the magnetic field that is formed by the permanent magnets 12, 14 is B; and the amount of constant current is I, Va, Vb and α can be expressed as follows.

$$Va = kBI \cdot \sin(\theta + \beta) \tag{1}$$

$$Vb = kBI \cdot \sin(\theta + \gamma) \tag{2}$$

$$\alpha = \gamma - \beta \tag{3}$$

Here, an operation angle θ' is defined as an angle that corresponds to the rotation angle of a rotating object in a cycle of 180 degrees. The operation angle θ' is expressed as follows.

$$\theta' = \arctan(\cot(\alpha/2) \times (Va - Vb)/(Va + Vb)) \tag{4}$$

Figure 5:
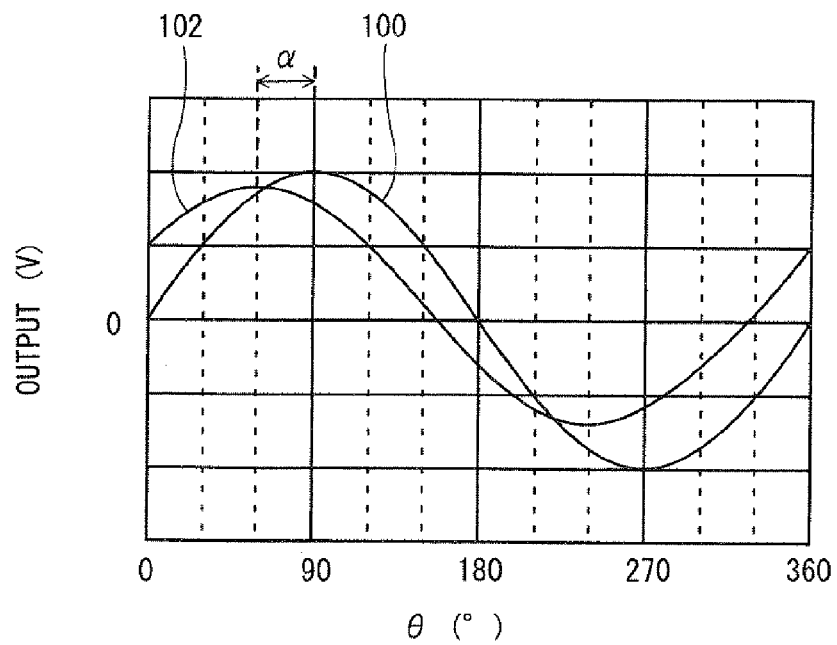
FIG. 5 is a graph showing the output voltage signals of a pair of Hall elements in case the output voltage signals are not corrected.
Figure 6A:
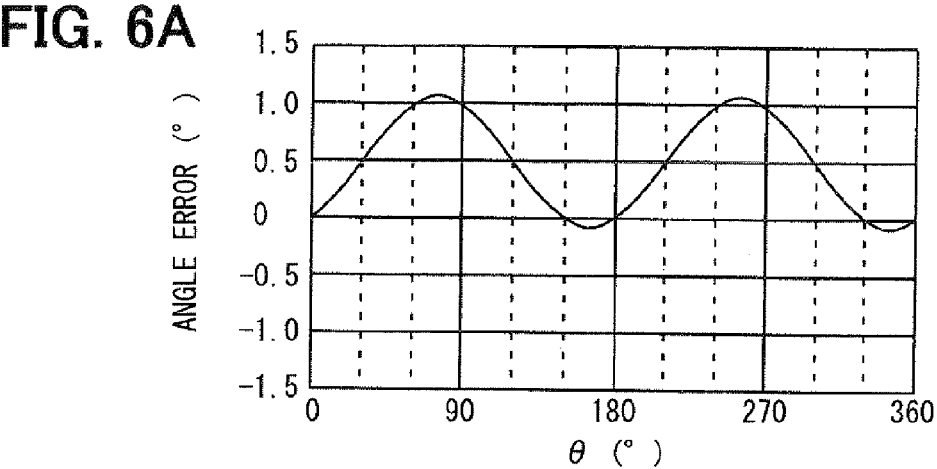
FIGS. 6A, 6B and 6C are graphs showing angle errors when the output signals of the Hall elements vary.

If, for example, the amplitude of the output voltage signal 102 is 1% smaller than the amplitude of the output voltage signal 100 as shown in FIG. 5, an angle error is produced as shown in FIG. 6A. This error periodically changes up to an amount of about 1.1° at a cycle of 180 degrees as the rotation angle of a rotating object changes.

Figure 6B:
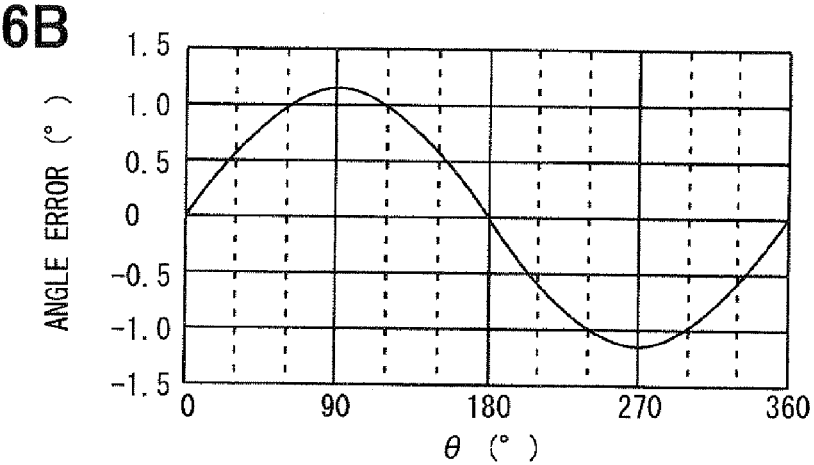

If a negative offset voltage is applied to the output voltage signal 102 as shown in FIG. 5, an angle error is produced as shown in FIG. 6B. This error periodically changes up to an amount of about ±1.2° at a cycle of 360 degrees as the rotation angle θ of a rotating object changes.

Figure 6C:
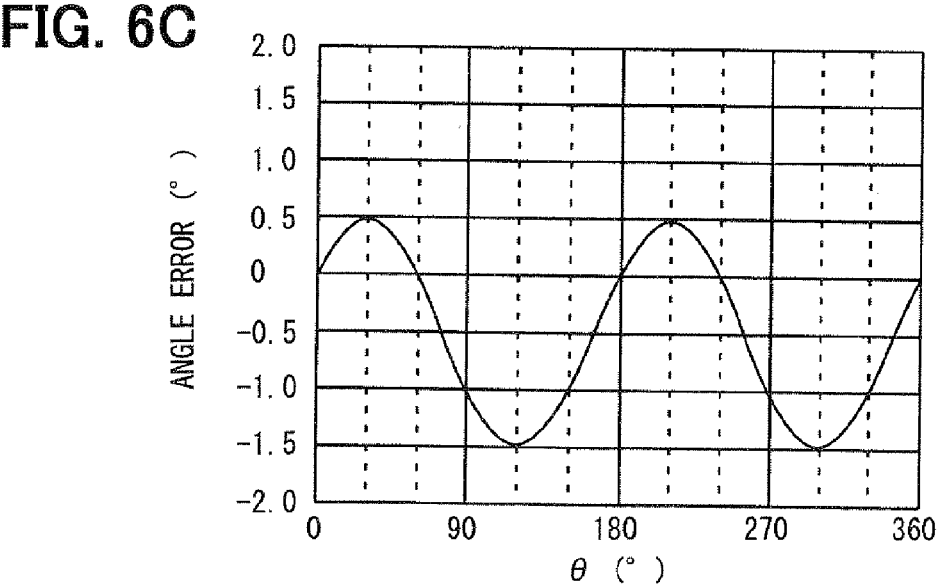

If, on the other hand, the phase difference between two of the output voltage signals changes by 1.0°, an angle error is produced as shown in FIG. 6C. This error periodically changes in a range between +0.5° and −1.5 at a cycle of 180 degrees as the rotation angle of a rotating object changes.

Figure 1:
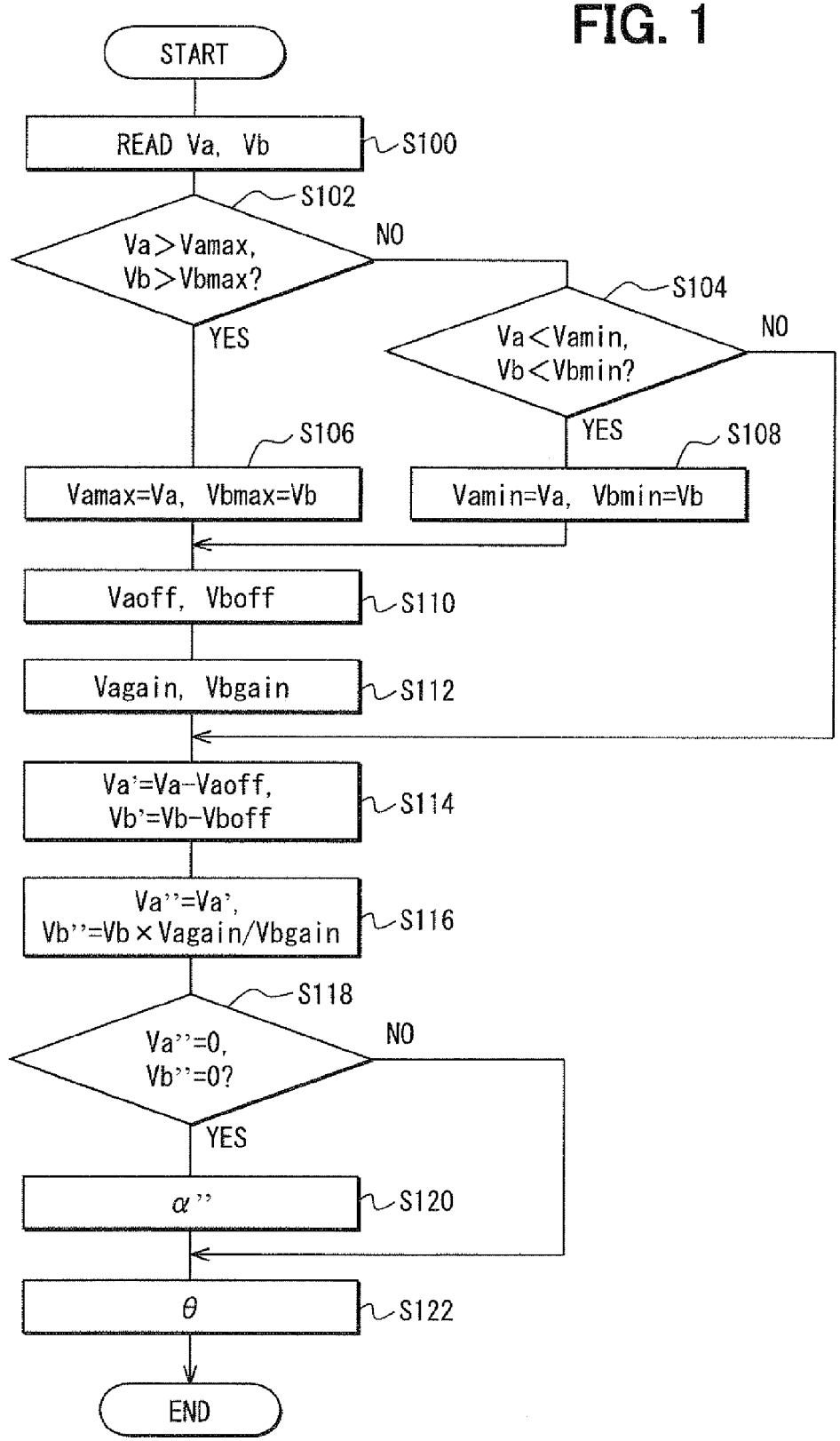
FIG. 1 is a flow diagram showing operation of a rotation angle detecting device according to the first embodiment of the invention.

The operation of the rotation angle detecting device 10 will be described with reference to FIG. 1.

At first, whether an offset correction is necessary or not is examined. For this purpose, the ECU 30 reads each of the output voltages Va, Vb of the output voltage signals 100, 102 of the Hall elements 21, 22 at step S100. Then, whether the output voltages Va, Vb are respectively higher than maximum values Vamax, Vbmax is examined at S102. If the result is NO, whether the output voltages Va, Vb are respectively lower than minimum values Vamin, Vbmin is examined at S104.

If the output voltages Va, Vb respectively fall within a range between the maximum values and the minimum values, an offset value correction and an amplitude correction are carried out at S114 and S116.

If, on the other hand, the output voltages Va, Vb are higher than the maximum values Vamax, Vbmax, the output voltages Va, Vb are updated by the maximum values Vamax, Vbmax at S106. If, on the other hand, the output voltages Va, Vb are lower than the minimum values Vamin, Vbmin, the output voltages Va, Vb are updated by the minimum values Vamin, Vbmin at S108.

Thereafter, offset correction values Vaoff, Vboff are updated according to the maximum values Vamax, Vbmax and the minimum values Vamin, Vbmin at S110. The offset correction is carried out according to the following expressions.

$$Va\text{off} = (Va\text{max} + Va\text{min})/2 \tag{5},$$

$$Vb\text{off} = (Vb\text{max} + Vb\text{min})/2 \tag{6}$$

Then, the amplitude correction is carried out according to the maximum values Vamax, Vbmax and the minimum values Vamin, Vbmin at S112. Amplitude correction values Vagain, Vbgain are expressed as follows.

$$Va\text{gain} = Va\text{max} - Va\text{off} \tag{7}$$

$$Vb\text{gain} = Vb\text{max} - Vb\text{off} \tag{8}$$

Subsequently, the offsets of the output voltage signals are corrected according to the offset correction values at S114, where the offsets are corrected according to the following expressions, $$Va' = Va - Va\text{off} \tag{9}$$

$$Vb' = Vb - Vb\text{off} \tag{10}$$

Next, the amplitudes of the output voltage signals Va, Vb are corrected at S116 according to the following expressions.

$$Va'' = Va' \tag{11}$$

$$Vb'' = Vb' \times Va\text{gain}/Vb\text{gain} \tag{12}$$

As a result, the output voltage signals 100, 102 shown in FIG. 5 are corrected to be the output voltage signals shown in FIG. 3. That is, the output voltage after correction Va", Vb" are expressed as follows, wherein k" is a coefficient to normalize the amplitude of the Va", Vb" to "1", and α" is a phase difference of the output voltage signals 100, 102 after correction.

$$Va'' = k'' \cdot \sin(\theta + \beta'') \quad (13)$$

$$Vb'' = k'' \cdot \sin(\theta + \gamma \beta'') \quad (14)$$

$$\alpha'' = \gamma'' - \beta'' \quad (15)$$

$$\theta' = \arctan(\cot(\alpha''/2) \times (Va'' - Vb'')/(Va'' + Vb'')) \quad (16)$$

Thereafter, whether the voltage of each of the corrected output voltage signals of the Hall elements 21, 22 is 0 or not is examined at S118.

If the value of the output voltage signal is 0, the phase of the output voltage signal is 0° or 180°.

Therefore, the following expressions are given.

$$\theta + \beta = 0 \quad (17)$$

$$\theta + \beta = 180 \quad (18)$$

Accordingly, the following expressions are given by the expressions (14), (15) and (17).

$$Vb''/k'' = \sin(\theta + \gamma'')$$
$$= \sin(\gamma'' - \beta'')$$
$$= \sin(\alpha'') \quad (19)$$

$$\alpha'' = a\sin(Vb''/k'') \quad (20)$$

The following expression are also given by the expressions (14), (16) and (18).

$$Vb''/k'' = \sin(180 - (\theta + \gamma''))$$
$$= \sin(180 - (180 - \beta'' + \gamma''))$$
$$= \sin(\beta'' - \gamma'')$$
$$= \sin(-\alpha'') \quad (21)$$

$$\alpha'' = -a\sin(Vb''/k'') \quad (22)$$

Therefore, the phase difference α" can be calculated at S120, as follows.

$$\alpha'' = |-a\sin(Vb''/k'')| \quad (23)$$

$$\alpha'' = |-a\sin(Va''/k'')| \quad (24)$$

Thus, the phase difference α" can be updated at S120.

Next, the operation angle θ' is calculated by the expression (16).

Figure 9:
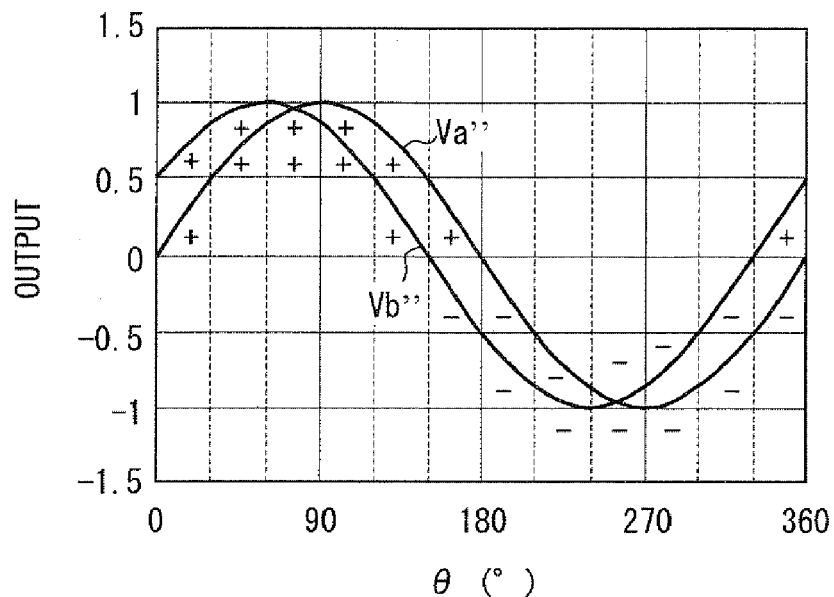
FIG. 9 is a graph showing changes in plus (+) or minus (−) sign of output voltage signals when the rotation angle changes.
Figure 10:
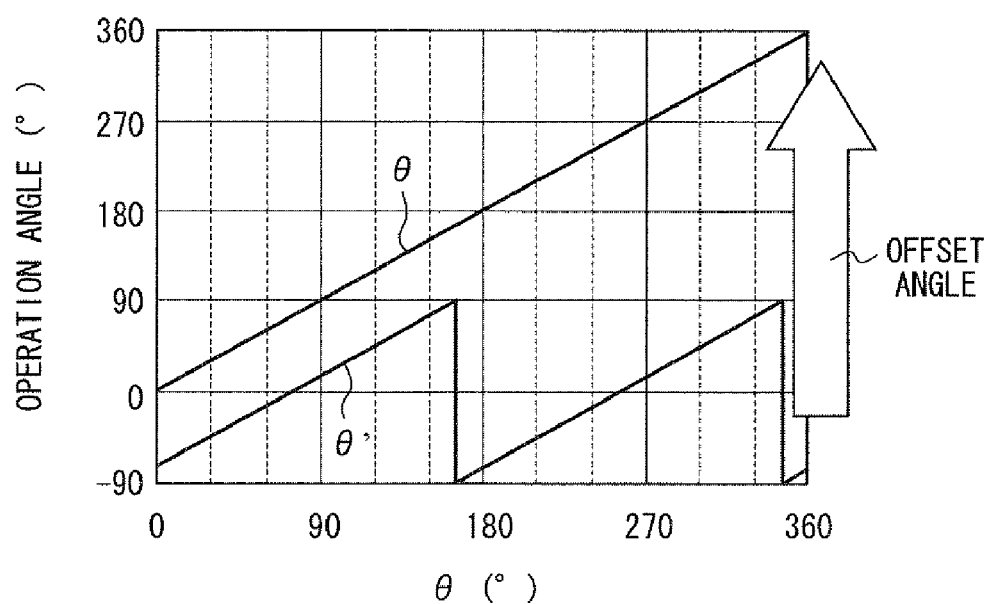
FIG. 10 is a graph showing a calculation of the rotation angle based on discriminated rotation angle position.

Thereafter, whether each of the output voltage signals Va", Vb" is plus (+) or minus (−) is examined so as to discriminate a rotation angle position from angles in the range of 360 degrees, as shown in FIGS. 9 and 10. Subsequently, an offset angle is added to the operation angle to calculate, based on the discriminated rotation angle position, the rotation angle θ that changes each cycle of 360 degrees, at S122.

As a variation-1 the phase difference of the output voltage signals can be calculated when the value of the output voltage signal is "1".

If the value of the output voltage signal is 1, the following expressions are given.

$$\theta + \beta = 90 \quad (25)$$

$$Vb''/k'' = \sin(180 - (\theta + \gamma''))$$
$$= \sin(90 + \beta'' - \gamma'')$$
$$= \sin(90 - \alpha'') \quad (26)$$

$$\alpha'' = 90 - a\sin(Vb''/k'') \quad (27)$$

The following expression is also given in the same manner as above.

$$\alpha'' = 90 - a\sin(Va''/k'') \quad (28)$$

As a variation-2 the phase difference of the output voltage signals can be calculated when the value of the output voltage signal is "−1".

If the value of the output voltage signal is −1, the following expressions are given.

$$\theta + \beta = -90 \quad (29)$$

$$Vb''/k'' = \sin(-90 - \beta'' + \gamma'')$$
$$= \sin(-90 + \alpha'') \quad (30)$$

$$\alpha'' = 90 + a\sin(Vb''/k'') \quad (31)$$

The following expression is also given in the same manner as above.

$$\alpha'' = 90 + a\sin(Va''/k'') \quad (32)$$

As a variation-3, the phase difference of the output voltage signals can be calculated when the values of the two output voltage signals are the same.

If the values of the two output voltage signals are the same, the following expressions are given by the expressions (13) and (14).

$$\theta + \beta'' = \theta + \gamma'' \quad (33)$$

If both Va" and Vb" are larger than 0, the following expressions are given.

$$\theta + \beta'' = 180 - (\theta + \gamma'') \quad (34)$$

$$Vb''/k'' = \sin(1/2 \times (180 - \beta'' + \gamma'')) \quad (35)$$
$$= \sin(1/2 \times (180 - \alpha''))$$

$$\alpha'' = 180 - 2 \times a\sin(Vb''/k'') \quad (36)$$

If, on the other hand, both Va" and Vb" are smaller than 0, the following expression (37) is given, and expressions (35) and (36) are given by the expressions (37) and (13)-(15).

$$180 - (\theta + \beta'') = (\theta + \gamma'') \quad (37)$$

$$Vb''/k'' = \sin(1/2 \times (-180 + \alpha'')) \quad (38)$$

$$\alpha'' = 180 + 2 \times a\sin(Vb''/k'') \quad (39)$$

Figure 7:
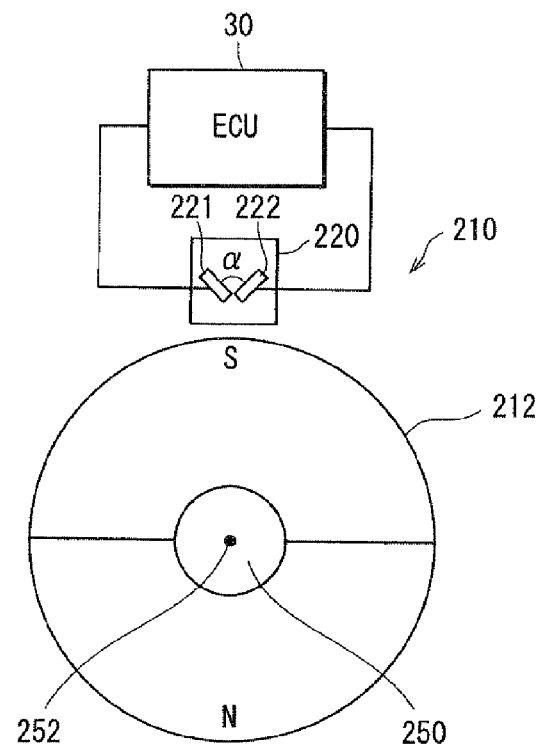
FIG. 7 is a schematic diagram of the rotation angle detecting device according to the second embodiment.

A rotation angle detecting device 210 according to the second embodiment of the invention will be described with reference to FIG. 7. Incidentally the same reference numeral as the precedent embodiment represents the same or substantially the same portion, part or component as the precedent embodiment, hereafter.

The rotation angle detecting device 210 according to the second embodiment is a device for detecting rotation angle of an engine crankshaft of a vehicle or a steering wheel thereof. As shown in FIG. 7, the rotation angle detecting device 210 includes a disk-shaped permanent magnet 212, a Hall IC 220 and the ECU 30.

The permanent magnet 212 is magnetized in a diametric direction thereof. The permanent magnet has a rotary shaft 250 that rotates together with a rotating object. The Hall IC 220 is disposed radially or axially outside the permanent magnet 212 to confront the same. The Hall IC 220 is a one chip IC that includes a pair of Hall elements 221 and 222. Each of the Hall elements 221, 222 has a sensing surface that inclines to the other at an angle α. The sensing surface also incline to the center axis 252 of the rotary shaft so that the output voltage signals of the Hall elements 221, 222 respectively change in sinusoidal curves when a rotating object rotates, as the Hall elements 21, 22 of the first embodiment.

Figure 8:
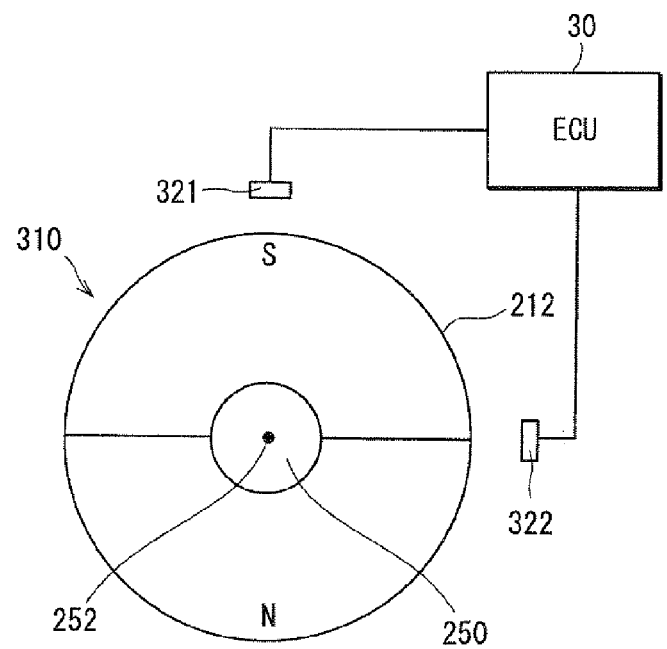
FIG. 8 is a schematic diagram of the rotation angle detecting device according to the third embodiment

A rotation angle detecting device 310 according to the third embodiment of the invention will be described with reference to FIG. 8.

The rotation angle detecting device 310 includes a disk-shaped permanent magnet 212, a pair of Hall elements 321, 322 and the ECU 30.

The Hall elements 321, 322 are disposed away from each other at portions along the periphery of the permanent magnet 212. The Hall IC 220 is a one chip IC that includes a pair of Hall elements 221 and 222. Each of the Hall elements 221, 222 has a sensing surface that inclines to the other at an angle α. The sensing surface also incline to the center axis 252 of the rotary shaft so that the output voltage signals of the Hall elements 221, 222 respectively change in sinusoidal curves when a rotating object rotates, as the Hall elements 21, 22 of the first embodiment.

In the preceding embodiments, the phase difference α" is updated every time the output voltage signals become a preset magnitude. The phase difference α" can be updated after the magnitude of the output voltage signals certain times becomes a preset value or a certain time after the magnitude of the output voltage signals becomes a preset value.

The phase difference α" can be obtained from the expressions (13) and (14) by use of the following expression.

$$\alpha''=(\theta+\gamma'')-(\theta+\beta'')=\gamma''=\beta'' \tag{40}$$

The Hall elements used in the preceding embodiments can be replaced by other magnetic sensors such as magneto-resistance elements.

In the preceding embodiments, the phase difference of the output voltage signals are calculated when the value of the output voltage signal is "1", when the value of the output voltage signal is "−1" or when the values of the two output voltage signals are the same. The phase difference can be calculated by another significant point that is a value corresponding to a known phase angle, by using the expressions (24), (27) (28), (31) and/or (32).

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims.

Accordingly, the description of the present invention is to be regarded in an illustrative, rather than a restrictive, sense.

What is claimed is:

1. A rotation angle detecting device for detecting a rotation angle of a rotating object, said device comprising:
    a magnetic field forming means for forming a magnetic field;
    a pair of magnetic sensor elements disposed in the magnetic field to provide a pair of output signals when the magnetic field changes as the rotating object rotates; and
    a rotation angle calculating means for calculating a rotation angle of the rotating object from the pair of output signals, wherein:
    the rotation angle calculating means calculates a phase difference between the pair of output signals from a magnitude of the output signal of one of the magnetic sensor elements when detecting a specific magnitude of the output signal of the other magnetic sensor element whose phase angle is known.

2. A rotation angle detecting device for detecting a rotation angle of a rotating object, said device comprising:
    a magnetic field forming means for forming a magnetic field;
    a pair of magnetic sensor elements disposed in the magnetic field to provide a pair of output signals when the magnetic field changes as the rotating object rotates; and
    a rotation angle calculating means for calculating a rotation angle of the rotating object from the pair of output signals, wherein:
    the rotation angle calculating means calculates a phase difference between the pair of output signals from a magnitude of the output signal of one of the magnetic sensor elements when detecting that the magnitudes of the output signals of the pair of magnetic sensor elements are the same to each other.

3. A rotation angle detecting device as in claim 1, wherein the rotation angle calculating means corrects respective offsets of the output signals before calculating the phase difference.

4. A rotation angle detecting device as in claim 1, wherein the rotation angle calculating means makes the output signals substantially the same in amplitude before calculating the phase difference.

5. A rotation angle detecting device as in claim 1, wherein the rotation angle calculating means calculates the phase difference after detecting that the magnitude of one of the output signals becomes a prescribed value for a prescribed number of times, and updates the phase the phase difference with the calculated value.

6. A rotation angle detecting device as in claim 1, wherein the rotation angle calculating means calculates the phase difference in a prescribed period of time after updating the phase difference, and updates the phase difference with the calculated value.

7. A rotation angle detecting device as in claim 1, wherein the specific magnitude of the output signal of the other magnetic sensor is zero (0).

8. A rotation angle detecting device as in claim 1, wherein the specific magnitude of the output signal of the other magnetic sensor is one of a maximum value and a minimum value.

* * * * *